United States Patent [19]

Bramwell

[11] Patent Number: 5,199,829
[45] Date of Patent: Apr. 6, 1993

[54] DOVETAIL SHAPER METAL-CUTTING TOOL

[76] Inventor: Darrell J. Bramwell, 1530 E. 650 N., New Castle, Ind. 47362

[21] Appl. No.: 861,650

[22] Filed: Apr. 1, 1992

[51] Int. Cl.$^5$ .......................... B23D 13/00; B23D 1/26
[52] U.S. Cl. ...................................... 407/120; 409/304
[58] Field of Search ........... 407/30, 33, 34, 42, 407/60, 61, 51, 55–58, 120; 409/304

[56] References Cited

U.S. PATENT DOCUMENTS 2,397,086 3/1946 Brady .................................. 409/132

Primary Examiner—Steven C. Bishop
Attorney, Agent, or Firm—Woodard, Emhardt, Naughton, Moriarty & McNett

[57] ABSTRACT

In a dovetail shaper metal-cutting tool that is utilized in a chip-type machining process to cut into a metal workpiece a specified dovetail-shaped slot having a specific right hand and left hand dovetail angle and a specified bottom dimension, the improvement comprising: a plurality of cutting teeth at least one of which has a both a right hand dovetail cutting edge to cut into the workpiece the specified right hand dovetail angle and a right hand bottom cutting edge that measures at least one-half of the specified bottom dimension of the dovetail slot to cut into the workpiece at least one-half of the specified bottom dimension, and at least one other of which has both a left hand dovetail cutting edge to cut into the workpiece the specified left hand dovetail angle and a left hand bottom cutting edge that measures at least one-half of the specified bottom dimension of the dovetail slot to cut into the workpiece at least one-half of the specified bottom dimension.

2 Claims, 2 Drawing Sheets

DOVETAIL SHAPER METAL-CUTTING TOOL

BACKGROUND OF THE INVENTION

1. Field of the Invention

The present invention relates generally to the field of metal-cutting machine tools, and more particularly is concerned with a novel dovetail shaper metal-cutting tool.

2. Description of the Prior Art

A dovetail shaper metal-cutting tool is utilized in a chip-type machining process to cut a dovetail-shaped slot into a workpiece. An illustrative dovetail shaper metal-cutting tool 10 of the prior art is illustrated in FIG. 4. Prior art tool 10 is utilized in Mitsubishi SC 25 CWC Shaper Cutter machine to cut a dovetail slot having a dovetail angle of 70° into an overdrive gear for a manual transmission. FIG. 3 illustrates a partial segment of a representative manual transmission overdrive gear 26 that has had a dovetail slot 28 cut amidst spline teeth 29 of the overdrive gear. The tool tooth illustrated in FIG. 3 is that of the present invention, however, and is not a tooth of prior art tool 10.

Prior art tool 10 has six teeth, two right hand dovetail cutting teeth 14, two left hand dovetail cutting teeth 12, and two square bottom cutting teeth 16. A dovetail slotting operation utilizing prior art tool 10 requires the use of three cutting teeth during three distinct cycles: a right hand cutting tooth 14 to form the right hand taper of the dovetail slot, a left hand cutting tooth 12 to form the left hand taper of the dovetail slot, and a square bottom cutting tooth 16 to form the squared bottom of the dovetail slot.

Experienced machine operators have found it difficult to maintain the desired dovetail angle on both sides of the dovetail cut and to machine the bottom of the dovetail cut perfectly flat when utilizing prior art tool 10 in a Mitsubishi SC 25 CWC Shaper Cutter machine. As many as eleven machine adjustments are necessary to set up this machine to properly orient the cutting teeth 12, 14, and 16 of prior art tool 10 to obtain the desired dovetail slot, and an illustrative cycle time necessary to complete a specified dovetail cut utilizing three cutting teeth of prior art tool 10 has been approximately 5 minutes. When in operation, no readily discernible evidence exists on the workpieces to alert the Machine operator that dovetail angles made by the cutting teeth 12 and 14 of prior art tool 10 may have exceeded acceptable tolerances or that a bottom cut is not perfectly flat.

Furthermore, the dovetail cut made with prior art tool 10, even when within acceptable tolerances, has not been pleasing to the eye, due to the necessary formation of tear drops in the dovetail cut resulting from right and left hand cutting teeth 12 and 14 cutting deeper into the workpiece than a bottom cutting tooth 16. This is done to avoid the formation of unacceptable ridges at the points where the left and right tapering dovetail cuts intersect the bottom square cut.

SUMMARY OF THE INVENTION

A preferred embodiment of the novel dovetail shaper metal-cutting machine tool of the present invention also has six cutting teeth, but three of the teeth each have a right hand dovetail cutting edge and a bottom cutting edge that measures at least one-half of the bottom dimension of the desired dovetail slot, and the three other teeth each have a left hand dovetail cutting edge and a bottom cutting edge that measures at least one-half of the bottom dimension of the desired dovetail slot. The novel dovetail tool of the present invention allows the desired dovetail slot to be cut using just two cutting teeth per cycle as opposed to the minimum three cutting teeth per cycle required when using prior art tool 10 (FIG. 4). This not only significantly reduces cycle time, but should produce 50% more workpieces per tool grind over the number produced per tool grind by prior art tool 10.

To utilize the novel dovetail shaper metal-cutting machine tool of the present invention in a Mitsubishi SC 25 CWC Shaper Cutter machines requires only four adjustments, as opposed to approximately eleven adjustments required when utilizing the prior art tool 10 (FIG. 4).

Another advantage of the novel dovetail tool of the present invention is the fact that if the desired dovetail angle of the left or right dovetail angle is not correct, a visible step will develop in the bottom of the dovetail slot where the bottom cuts overlap that will alert an operator that the cut is out of tolerance.

Another preferred embodiment of the present invention is as follows: in a dovetail shaper metal-cutting tool that is utilized in a chip-type machining process to cut into a metal workpiece a specified dovetail-shaped slot having a specified right hand and left hand dovetail angle and a specified bottom dimension, the improvement comprising: a plurality of cutting teeth at least one of which has both a right hand dovetail cutting edge to cut into the workpiece the specified right hand dovetail angle and a right hand bottom cutting edge that measures at least one-half of the specified bottom dimension of the dovetail slot to cut into the workpiece at least one-half of the specified bottom dimension, and at least one other of which has both a left hand dovetail cutting edge to cut into the workpiece the specified left hand dovetail angle and a left hand bottom cutting edge that measures at least one-half of the specified bottom dimension of the dovetail slot to cut into the workpiece at least one-half of the specified bottom dimension.

An object of the present invention is to provide a dovetail shaper metal-cutting machine tool that will cut a dovetail slot into a metal workpiece more efficiently and with greater speed and accuracy than dovetail tools 10 of the prior art (FIG. 4).

Related objects and advantages of the present invention will be apparent from the following description.

DESCRIPTION OF THE PREFERRED EMBODIMENT

Figure 1:
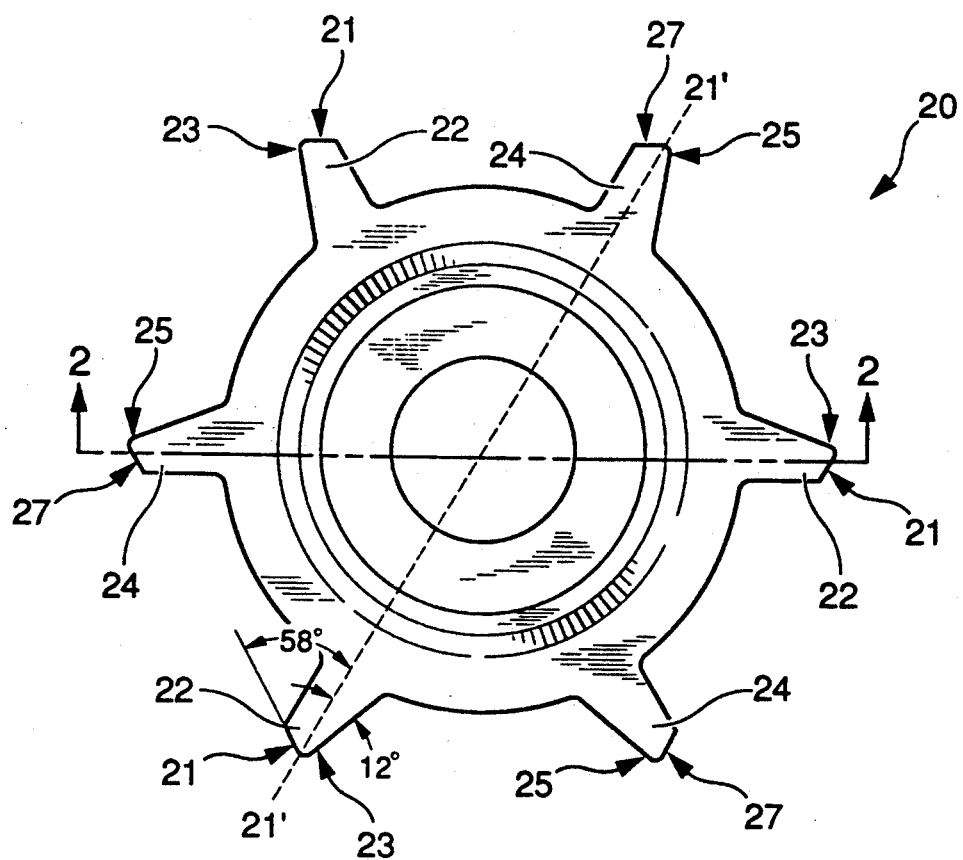
FIG. 1 is a top plan view of one embodiment of the dovetail shaper metal-cutting tool 20 of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The manufacture of shaper metal-cutting machine tools to order and/or specification is a well known art to those skilled in this field. The preferred embodiment of the novel dovetail shaper metal-cutting tool 20 of the present invention illustrated in FIGS. 1-3 was ground to order and specification by ITW Illinois Tools, An Illinois Tools Works Company, Lincolnwood, Ill. 60645, for use in a Mitsubishi SC 25 CWC Shaper Cutter machine. The illustrated dovetail tool 20 of the present invention has been ground to cut dovetail slots having a dovetail angles of 70° (FIG. 3, see also line 21'—21') into an overdrive gear for a manual transmission (26, FIG. 3). If another dovetail angle is more desirable, the novel dovetail tool 20 of the present invention could be ground to order and specification accordingly, following the principles of the present invention. Almost any dovetail angle could be achieved.

Figure 2:
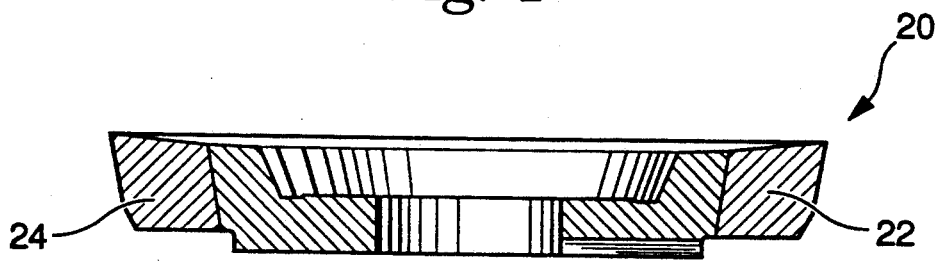
FIG. 2 is a cross sectional side view of the dovetail tool 20 of FIG. 1 taken along line 2—2.
Figure 3:
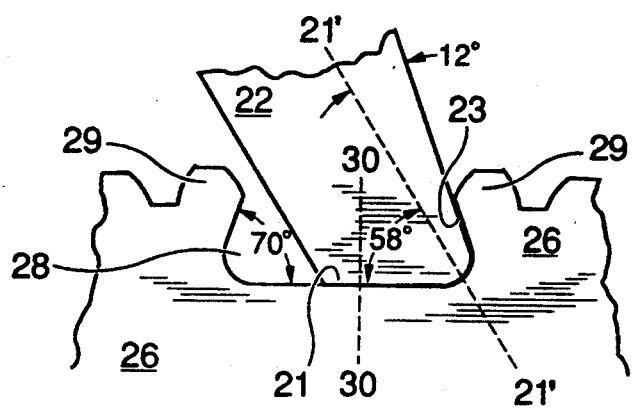
FIG. 3 is a segmented side view of a right hand cutting tooth 22 of the dovetail tool 20 of FIG. 1 shown in cutting position within a dovetail cut 28 amidst the spline teeth 29 of an overdrive gear for a manual transmission 26.

Referring now to FIGS. 1 and 3, the novel dovetail shaper metal-cutting machine tool 20 of the present invention has six cutting teeth, three (22) having a right hand dovetail cutting edge 23 and a right hand bottom cutting edge 21 that measures at least one-half (line 30—30, FIG. 3) of the bottom dimension of the desired dovetail slot (28, FIG. 3), and three (24) teeth having a left hand dovetail cutting edge 25 and a left hand bottom cutting edge 27 that measures at least one-half (line 30—30, FIG. 3) of the bottom dimension of the desired dovetail slot (28, FIG. 3). The novel dovetail tool 20 of the present invention allows the desired dovetail slot (28, FIG. 3) to be cut using just two cutting teeth per cycle, one cutting tooth 22 and one cutting tooth 24, as opposed to the minimum three cutting teeth per cycle required when using the prior art tool 10 (one 12, one 14, and one 16, FIG. 4). In comparison testing to date with the prior art tool 10 of FIG. 4, the novel dovetail tool 20 of the present invention reduced an exemplary dovetail slot cutting cycle time by more than 50%. It is also estimated that the novel dovetail tool 20 of the present invention could produce 50% more dovetail cuts per tool grind over the number produced per tool grind by the prior art tool 10 (FIG. 4).

Figure 4:
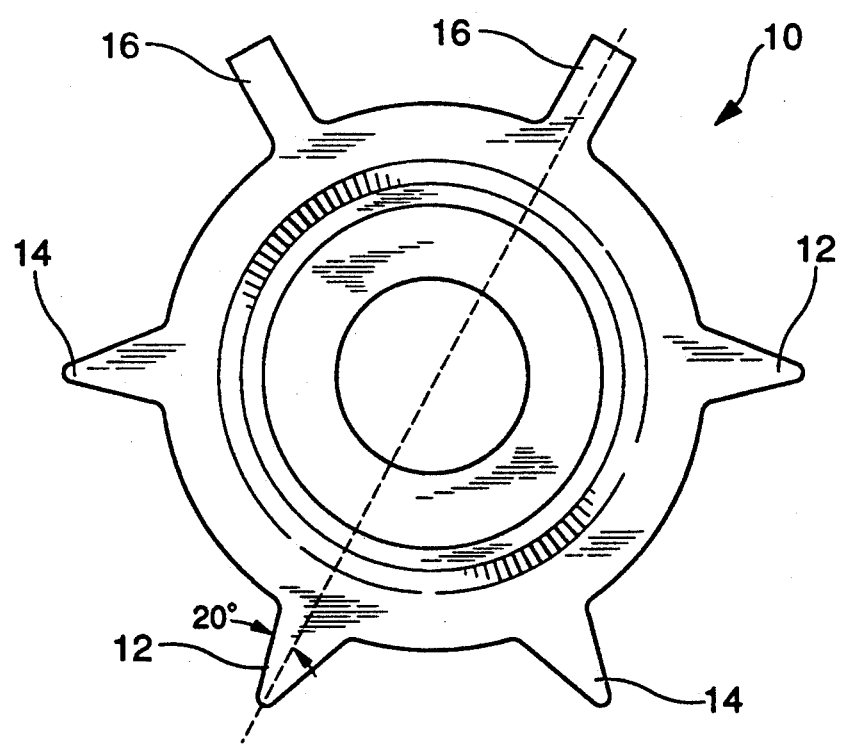
FIG. 4 is a top plan view of a dovetail shaper metal-cutting tool 10 of the prior art, and is therefore a prior art drawing.

As will be clear to those skilled in the use of Mitsubishi SC 25 CWC Shaper Cutter machines, to utilize the novel dovetail tool 20 of the present invention in Mitsubishi SC 25 CWC Shaper Cutter machines requires only four tool adjustments, as opposed to the approximately eleven adjustments required when utilizing the prior art tool 10 (FIG. 4).

Yet another advantage of the novel dovetail tool 20 of the present invention is the fact that if the desired dovetail angle of the left or right dovetail taper of dovetail slot 28 is not correct, a visible step will develop along the bottom dimension of the dovetail slot (28, FIG. 3) created by the misaligned overlapping bottom edges 21 or 27 of cutting teeth 22 or 24, respectively, which will visibly alert an operator that the dovetail cut is out of tolerance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a dovetail shaper metal-cutting tool that is utilized in a chip-type machining process to cut into a metal workpiece a specified dovetail-shaped slot having a specified right hand and left hand dovetail angle and a specified bottom dimension, the improvement comprising:

a plurality of cutting teeth at least one of which has both a right hand dovetail cutting edge to cut into the workpiece the specified right hand dovetail angle and a right hand bottom cutting edge that measures at least one-half of the specified bottom dimension of the dovetail slot to cut into the workpiece at least one-half of the specified bottom dimension, and at least one other of which has both a left hand dovetail cutting edge to cut into the workpiece the specified left hand dovetail angle and a left hand bottom cutting edge that measures at least one-half of the specified bottom dimension of the dovetail slot to cut into the workpiece at least one-half of the specified bottom dimension.

2. The dovetail shaper metal-cutting tool of claim 1 wherein there are three cutting teeth having both a right hand dovetail cutting edge to cut into the workpiece the specified right hand dovetail angle and a right hand bottom cutting edge that measures at least one-half of the specified bottom dimension of the dovetail slot to cut into the workpiece at least one-half of the specified bottom dimension, and three cutting teeth having both a left hand dovetail cutting edge to cut into the workpiece the specified left hand dovetail angle and a left hand bottom cutting edge that measures at least one-half of the specified bottom dimension of the dovetail slot to cut into the workpiece at least one-half of the specified bottom dimension.

* * * * *